(12) United States Patent
Verdegan et al.

(10) Patent No.: US 7,922,914 B1
(45) Date of Patent: Apr. 12, 2011

(54) METHODS AND SYSTEMS FOR MONITORING CHARACTERISTICS IN A FLUID FLOW PATH HAVING A FILTER FOR FILTERING FLUID IN THE PATH

(75) Inventors: Barry M. Verdegan, Stoughton, WI (US); David P. Genter, Columbus, IN (US); Michael T. Zuroski, Sun Prairie, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 492 days.

(21) Appl. No.: 11/844,018

(22) Filed: Aug. 23, 2007

(51) Int. Cl.
*B01D 35/143* (2006.01)

(52) U.S. Cl. ............ 210/741; 96/421; 210/90; 210/96.1; 700/29; 702/47; 702/50; 702/98

(58) Field of Classification Search .......... 210/85, 210/87, 90, 93, 96.1, 96.2, 108, 138, 143, 210/335, 741, 791; 96/421, 422; 73/38, 73/40; 700/29, 30, 273; 703/7, 9; 702/47, 50, 98, 100
See application file for complete search history.

(56) References Cited

U.S. PATENT DOCUMENTS

| | | | | |
|---|---|---|---|---|
| 4,107,037 A | * | 8/1978 | Cavanaugh et al. | 210/791 |
| 4,562,529 A | * | 12/1985 | Drummond | 700/12 |
| 4,685,066 A | * | 8/1987 | Hafele et al. | 702/50 |
| 5,968,371 A | | 10/1999 | Verdegan et al. | |
| 7,174,273 B2 | | 2/2007 | Goldberg | |

* cited by examiner

*Primary Examiner* — Joseph W Drodge
(74) *Attorney, Agent, or Firm* — Andrus, Sceales, Starke & Sawall (57) ABSTRACT

Methods and systems are provided for measuring pressure drop through a filter in the flow path and then using the measured pressure drop, possibly at a normalized state and in conjunction with time and/or other data from the system, to estimate characteristics of the fluid, the filter, and/or a working component supplied with the filtered fluid. Such characteristics could include an operating condition of the filter, the remaining useful life of the filter, the relative contaminant concentration in the fluid, and/or the remaining useful life of a working component supplied with the filtered fluid.

22 Claims, 6 Drawing Sheets

METHODS AND SYSTEMS FOR MONITORING CHARACTERISTICS IN A FLUID FLOW PATH HAVING A FILTER FOR FILTERING FLUID IN THE PATH

BACKGROUND AND SUMMARY

The present application relates to methods and systems for monitoring characteristics in a fluid flow path having a filter that is filtering fluid in the path. More particularly the application relates to methods and systems for measuring $\Delta P$ (pressure drop) of fluid flowing through a filter in the fluid flow path and then using the measured $\Delta P$, possibly at a normalized state and/or in conjunction with time and/or other data from the system, to diagnose or estimate characteristics of the fluid, the filter, and/or a working component supplied with the fluid. Such characteristics could include an operating condition of the filter, the remaining useful life of the filter, the relative contaminant concentration in the fluid, and/or the remaining useful life of a working component supplied with the fluid.

The methods and systems described herein are particularly useful when applied to fuel filtration systems for diesel engines. A fuel filtration system for a diesel engine usually has one or more filters. A primary purpose of the filtration system is to maintain fuel contamination levels below specified levels to thereby protect the fuel injection system in the engine from contamination.

The amount of contamination removed by a filter or by a plurality of filters can be measured in a variety of ways. For example it can be defined in terms of $\beta$—i.e., the time-weighted ratio of the number concentration of particles larger than a certain size upstream of certain filter(s) to the number concentration of particles larger than the same size downstream of the filter(s) under defined multi-pass filter test conditions. However, as will be recognized by those skilled in the art, contamination removal can also be measured by evaluating efficiency, penetration, filtration ratio, etc.

In actual use, a wide range of potential conditions may exist, in terms of contaminant nature and concentration, operable conditions of the filter, and operable conditions of the engine. In particularly demanding applications, special measures are often required, including use of special filters, use of modified service intervals, replacement of engine components, and/or other measures. However, it is often difficult for operators to know when and what special measures are required. In these applications, it is desirable to provide methods and systems for diagnosing or estimating an operable condition of a filter in the filtration system and/or a level of contamination in the fluid. It is further desirable to provide methods and systems for estimating component or system life based on the cleanliness history of the system in order to guide maintenance and replacement schedules. There is also a need for methods and systems that advise operators of the above-noted conditions and further recommend an appropriate response.

Similar needs exist in applications other than diesel engines. Advantageously, the methods and systems described and claimed herein are also useful in any one of a wide variety of applications having a fluid flow path for fuel, oil, lubrication, hydraulics, air, water and/or other fluids including gases and/or liquids.

BRIEF DESCRIPTION OF THE DRAWINGS

The best mode of carrying out the invention is described hereinbelow with reference the following drawing figures.

DETAILED DESCRIPTION OF THE DRAWINGS

The following description and drawings provide examples of a fluid flow path having a filter that is filtering fluid in the path. Methods and systems are also provided for assessing characteristics of the fluid, filter, and/or working component (s) supplied with the fluid. In general, the methods and systems utilize a known relationship (e.g. for a predetermined reference filter) between contaminant removal and time (at a defined contaminant concentration) or contaminant loading (i.e. the amount of contaminant to which the filter has been exposed). Although the examples provide contaminant removal in terms of $\beta$ (defined above), it will be recognized by those skilled in the art that any measure of removal including but not limited to $\beta$, efficiency, penetration, filtration ratio, etc., may be used to accomplish the objectives of the invention.

Figure 1:
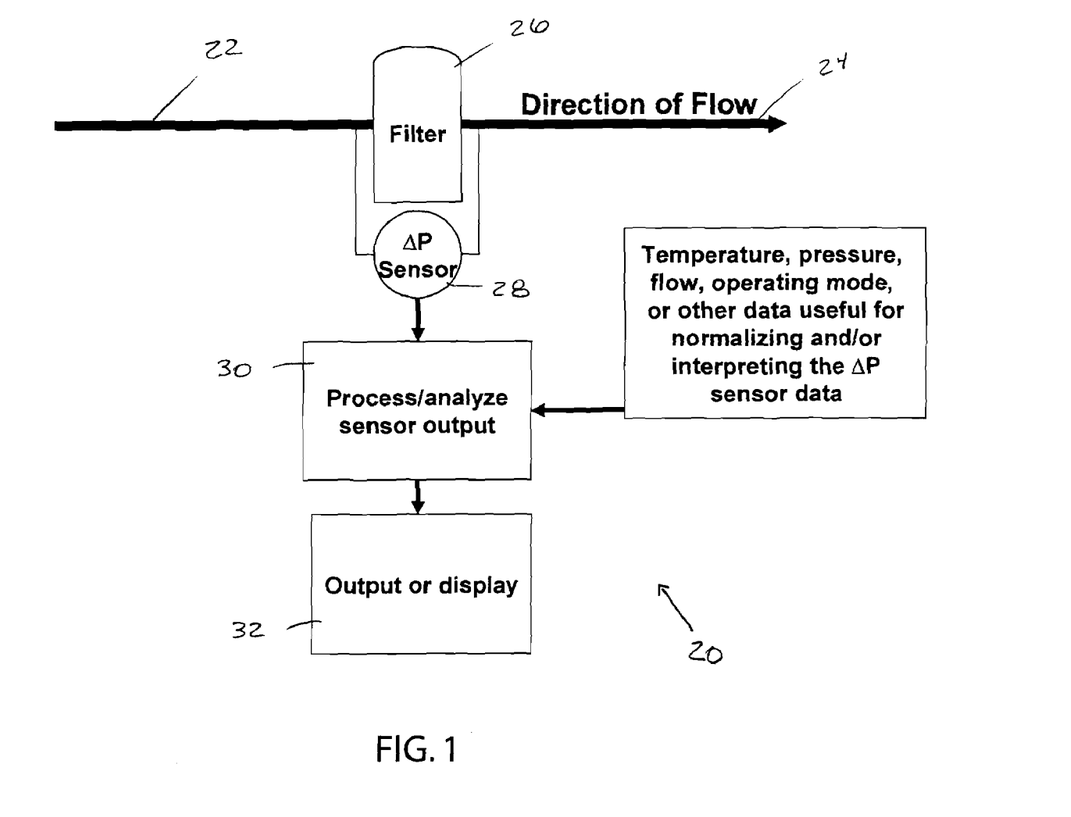
FIG. 1 is a schematic illustration of a system for monitoring characteristics in a fluid flow path having a filter that is filtering fluid in the path.

FIG. 1 is a schematic illustration of a system for monitoring characteristics in a in a fluid flow path having a filter that is filtering fluid in the path. The system 20 includes a fluid flow path 22 wherein fluid such as fuel, oil, air, water, etc. flows along a direction of flow indicated by arrow 24. At least one filter 26 is positioned in the flow path 22 and actively filters contamination from the fluid. A differential pressure sensor 28 communicates with the fluid flow path 22 to sense pressure drop ($\Delta P$) in the fluid as it flows through the filter 26.

An electronic control module or controller 30 communicates with the sensor 28 to receive the sensed $\Delta P$ values. The controller 30 is programmed to filter out effects of electrical and other undesirable noise contributions from the sensed values. The controller 30 is also equipped and programmed to process the measured $\Delta P$ by, for example, time averaging the data and/or normalizing the data with respect to a reference state (e.g. a defined flow rate and viscosity). As discussed further below, this may be done by simply using the output from the sensor 28 alone, or in conjunction with system data and information from other sources, such as fluid temperature, fluid flow rate, engine duty cycle, time, etc. The controller 30 is also equipped and programmed to analyze the $\Delta P$ values (usually at a normalized state with regards to fluid viscosity and temperature) in accordance with known relationships between $\Delta P$, contaminant removal, time, and/or other factors for a selected reference filter to determine characteristics of the fluid, filter and/or other working components being supplied with the fluid. In addition, the controller 30 is adapted to communicate with a display 32 for displaying the measured and processed data and characteristics to a user or operator. Instead of, or in addition to the display 32, the controller 30 may communicate with another output means such as audio speakers, a tactile feedback device, or any other means for providing an indication of the measured and/or processed data and characteristics to the operator, engine or equipment.

By the present application, it is recognized as useful for several reasons to measure ΔP in fluid that flows through the filter 26 and then compare the measured ΔP value(s), possibly at a normalized state with regards to fluid viscosity and flow rate and in conjunction with time and/or other data from the system 20, to a reference filter for which there exists a known correlation between ΔP and other characteristics of the fluid, the filter, and/or a working component supplied with the filtered fluid at the defined fluid viscosity and flow rate.

The measured ΔP data can be normalized to a predefined reference state because of the fact that in the fluid flow path 22, the relationship between ΔP through filter 26 and fluid viscosity and flow rate is known. That is, for typical fuel, lube or hydraulic filters, ΔP is directly proportional to viscosity and flow rate, according to Darcy's Law:

$$Q = \frac{kA\Delta P}{\mu L}$$

where Q=flow rate
k=media permeability
A=cross-sectional area of the media
ΔP=pressure drop
μ=viscosity
L=thickness of the media For a given filter and filter application, k, A and L are constant, hence ΔP only need be normalized with respect to μ and Q. Viscosity can be determined directly using appropriate sensors or algorithms, or can be calculated from temperature data and the known relationship between viscosity and temperature for the fluid. In this manner, ΔP measured from the active filter 26 can be normalized to what it would be at a predefined viscosity and temperature for the fluid. This facilitates comparison to the reference filter, which also operates at the predefined viscosity and temperature for the fluid.

In applications where viscosity, temperature and/or flow rate information is not available, other means may be used to normalize the data. For example, U.S. Pat. No. 5,968,371 discusses a manner in which ΔP data may be empirically corrected for viscosity and flow rate. Alternatively, the data can be normalized by collecting data only when the system 20 is operating at a particular reference state. For example, in a diesel engine, if data is only collected when the engine has warmed up and is operating at idle, as it is a condition at which the temperature and flow rate are essentially constant, this becomes the reference state for ΔP and no further normalization is required.

As stated above, interpretation of the data is based on a comparison of the normalized ΔP data for the active system 20 to the known behavior of a reference filter operating at the normalized state. This "behavior" can include changes in normalized ΔP and contaminant removal. Therefore, it is important to define an appropriate reference filter with respect to the particular application of the system 20. The reference filter can be the same type of filter as the filter 26 of the system 20, or it can be a hypothetical filter for the particular application. If the same type of filter, reference filter can be obtained by measuring ΔP and contaminant removal, and how contaminant removal varies as a function of time or flow rate and contaminant loading for the reference filter. If a hypothetical filter, the behavior of the hypothetical behavior can be derived from knowledge of filters commonly used for the particular application. Alternatively, a typical initial and terminal ΔP for the application could be combined with a function describing ΔP and contaminant removal, and how contaminant removal varies as a function of time and contaminant load. The reference behavior information can be stored in the controller 30, or in a separate memory accessible by the controller 30, for use in interpreting the ΔP data.

The present application provides several methods and systems for interpreting the normalized ΔP data by comparing it to the behavior of a reference filter, as discussed hereinbelow.

Figure 2:
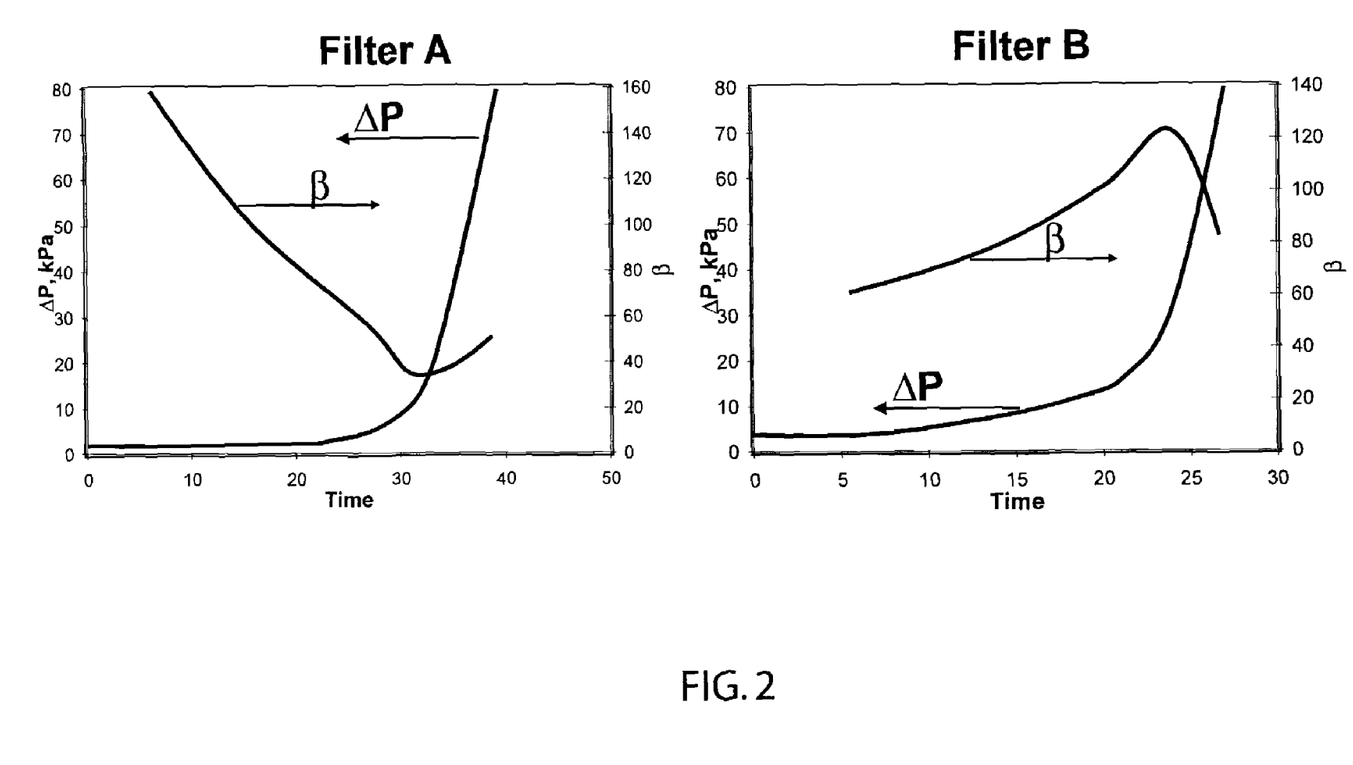
FIG. 2 is a graph illustrating $\Delta P$ (pressure drop of fluid that flows through the filter) and $\beta$ for two reference filters.

FIG. 2 is a graph illustrating the known ΔP and β behavior of two reference filters (filters A and B) as a function of time, as determined using a standard laboratory filter test, such as ISO 16889.

Figure 3:
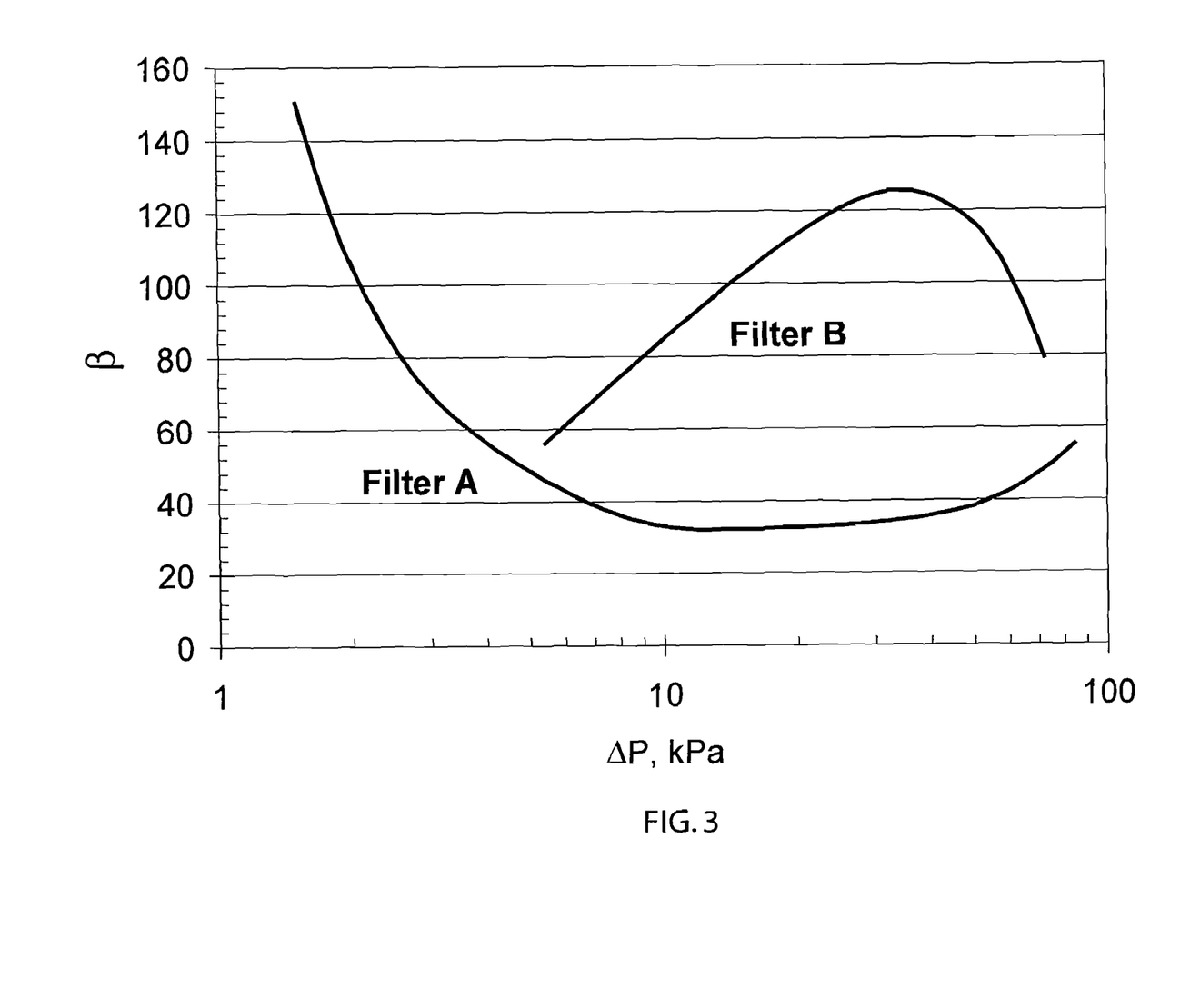
FIG. 3 is a graph illustrating the relationship between $\Delta P$ and $\beta$ for the two reference filters.

FIG. 3 is a graph illustrating a filter performance model for the known relationship between ΔP and β for filters A and B. FIG. 3 indicates that for a given ΔP (or test time under standardized conditions) for each reference filter a corresponding β can be expected. Thus, when sensor 28 senses the ΔP through the filter 26 and controller 30 receives the measured ΔP, the controller can compare the measured ΔP (at a normalized state) to the known behavior of a selected reference filter (e.g. filter A) to estimate β for the filter 26. As an example, with reference to FIG. 3, if a measured ΔP that is normalized in accordance to a reference state for filter A is 10 kPa, the value for β for the filter 26 can be estimated to be about 36.

Figure 4:
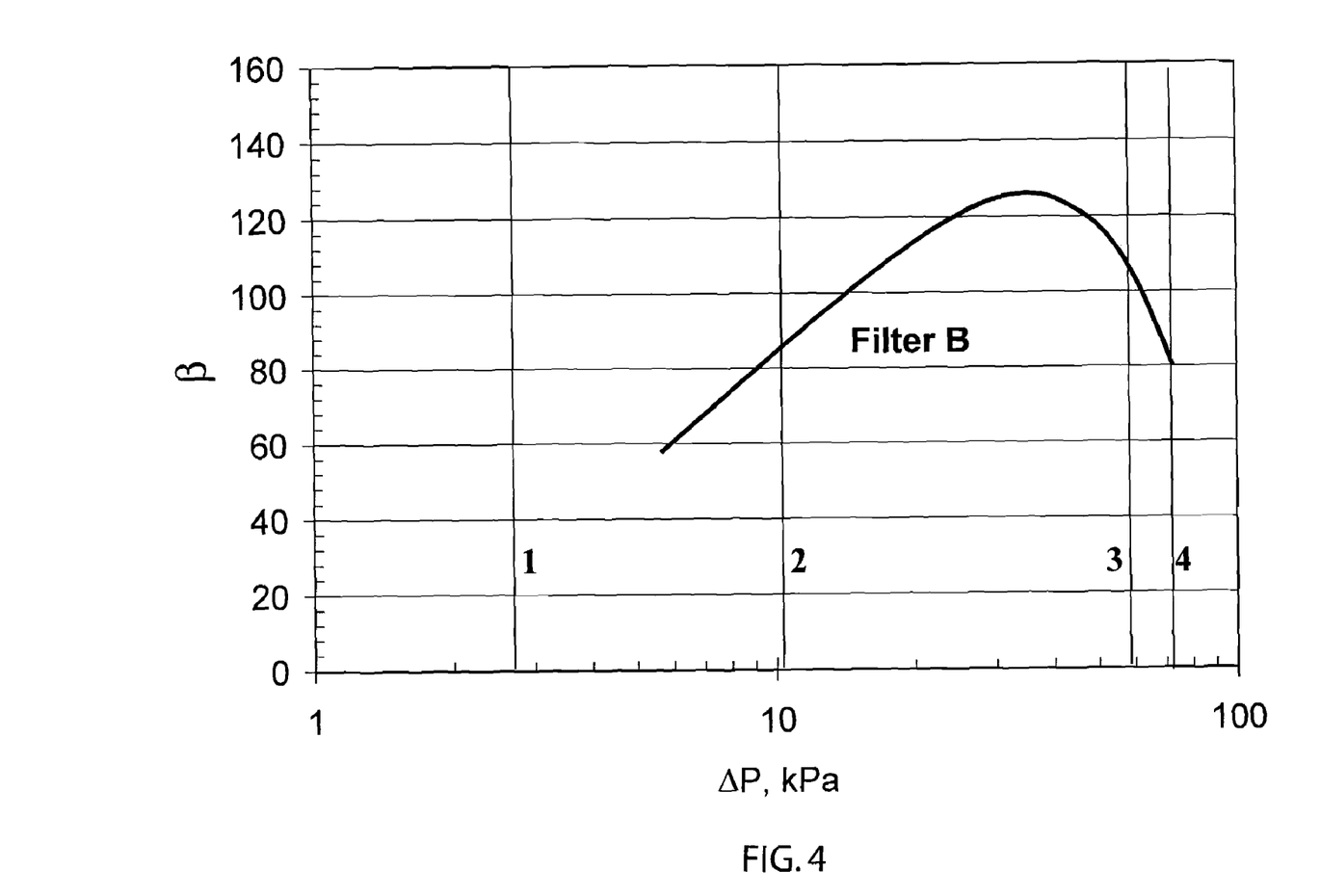
FIG. 4 is a graph illustrating the relationship between $\Delta P$ and $\beta$ for a reference filter and four normalized $\Delta P$ values for the active filter shown in FIG. 1.

FIG. 4 is a graph illustrating a method for using normalized ΔP data to deduce an operational state or condition of the filter 26. More specifically, FIG. 4 illustrates known ΔP data for the reference filter B. (For purposes of illustration, it is assumed that the ΔP data in FIGS. 2, 3 and 4 has already been normalized.) In FIG. 4, there are four vertical lines (labeled 1, 2, 3 and 4). Each line refers to a specific normalized ΔP for the filter 26 and the intersection of each line with the β-ΔP curve indicates the corresponding approximate β for the filter 26 based on the reference data. Using this data based upon experience and knowledge of the relationship between β and ΔP and time, an operational state of the filter 26 can be determined and displayed on the display 32 in a manner allowing the operator to take action.

In the example, a four level alarm system is used, as described hereinbelow.

1. If the normalized ΔP is below a certain level (e.g., line 1), the filter's structural integrity has been compromised (collapsed, burst, ripped, etc.) and needs to be replaced.

2. If the normalized ΔP is within a certain normalized ΔP range (e.g., line 2), the filter is operating properly.

3. If the normalized ΔP is within a certain higher normalized ΔP range (e.g., line 3), the filter performance is starting to degrade and, for optimum performance, should be replaced. Depending on the local conditions, this may prompt the operator to replace the filter earlier than planned.

4. If the normalized ΔP is above a certain critical normalized AP (e.g., line 4), the filter is plugged and needs to be replaced.

Each of the above-described operational conditions could be indicated by a different color of light on the dashboard, different number of lights, by a displayed error code, or other perceptible means. This advantageously provides information to service personnel regarding component condition and its remaining life and allows the operator to make more sound decisions concerning the operation of the system; and in applications with particularly clean fluid (e.g. fuel), this may permit operators to extend filter service intervals and save money without adversely affecting the system 20.

Figure 5:
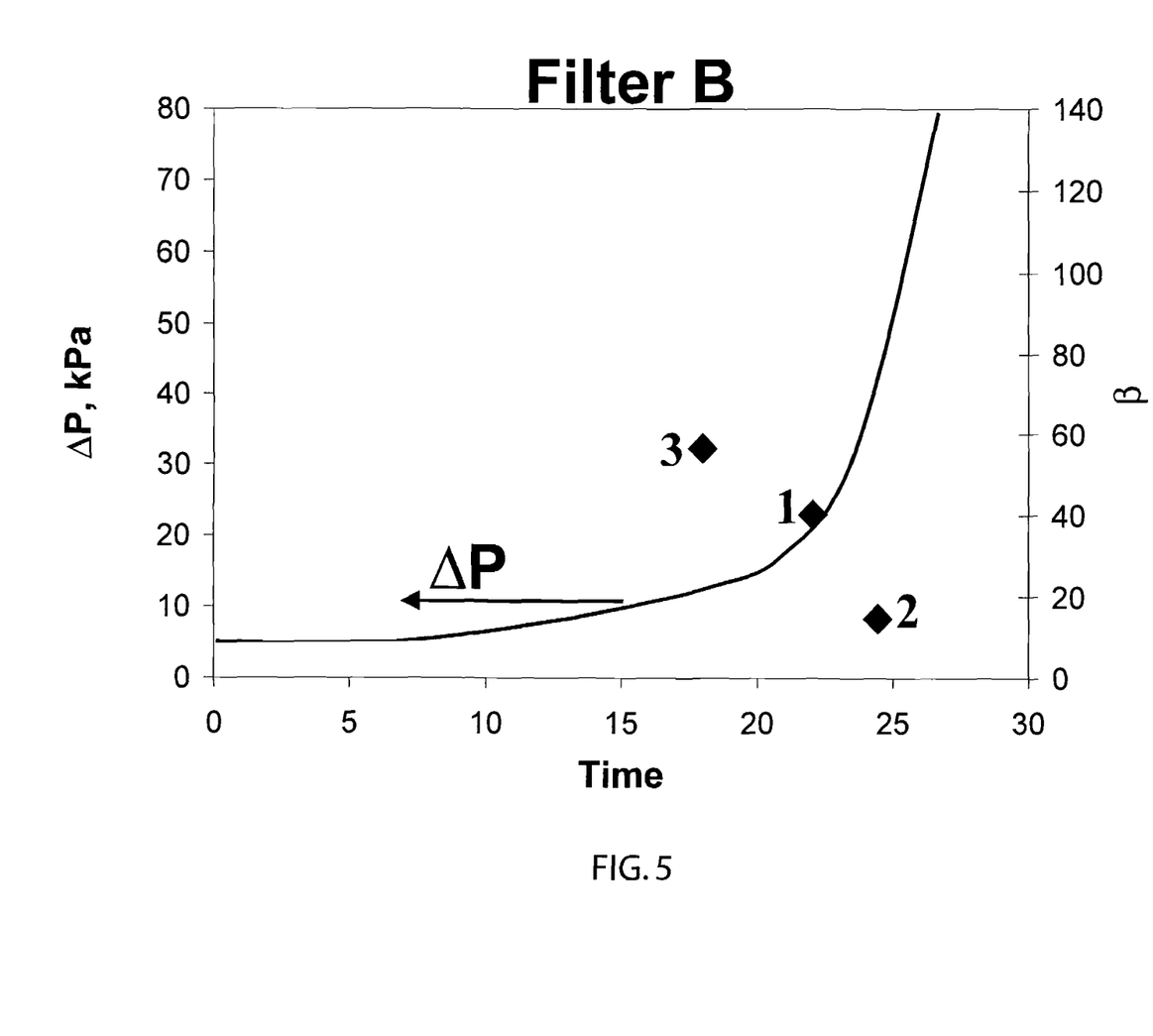
FIG. 5 is a graph illustrating normalized $\Delta P$ data as a function of time for a reference filter and three normalized $\Delta P$ values for the active filter shown in FIG. 1.

FIG. 5 is a graph illustrating ΔP behavior for a particular reference filter as a function of time. Also depicted are three values (labeled 1, 2, and 3) for ΔP monitored by the sensor 26 and normalized by the controller 30. By comparing the normalized ΔP data to the ΔP behavior for the reference filter for the same time of operation, the relative contaminant concentration of the fluid can be deduced. That is, to estimate contaminant concentration requires normalized ΔP data and data concerning the number of hours of operation since the filter was installed. The time and volume data can be collected by direct measurement or by calculation from flow rate and time data.

Alternatively, FIG. 5 could depict a graph illustrating ΔP behavior for a particular reference filter as a function of the volume of fluid filtered. By comparing the normalized ΔP data to the ΔP behavior for the reference filter for the same volume of fluid filtered, the relative contaminant concentration of the fluid can be deduced. That is, to estimate contaminant concentration requires normalized ΔP data and data concerning the volume of fluid filtered. The volume data can be collected by direct measurement or by calculation from flow rate and time data In the illustrated example, case 1 exhibits approximately the same normalized ΔP at the corresponding time as the reference filter, which indicates that the contaminant concentration of the fluid in the system 20 is similar to that of the reference filter. In contrast, case 2 exhibits a lower normalized ΔP, indicative of a contaminant concentration lower than the reference filter. Case 3 exhibits a higher normalized ΔP than the ΔP of the reference filter at the same time, which suggests more highly contaminated fluid.

Based on knowledge of how much higher or lower the normalized ΔP is relative to the ΔP of the reference filter, the results and a recommendation for appropriate action can be displayed or otherwise indicated to the operator. For example, if the normalized ΔP is:

Increasing more gradually than expected, i.e., the normalized ΔP at a particular time is lower than the ΔP of the reference filter as in case 2, this suggests cleaner fluid (e.g. fuel) than anticipated and suggests that the operator could extend filter service intervals;

Increasing at a normal rate relative to the ΔP of the reference filter, as in case 1, this suggests the normal filter service interval should be used; or Increasing faster than normal, i.e., the normalized ΔP at a particular time is higher than the ΔP of the reference filter as in case 3, this suggests that the fluid (e.g. fuel) is more contaminated than normal and a shortened filter interval or different combination of filters should be used.

According to this method and system, the controller 30 can be programmed to provide an early warning to the operator that fluid contamination levels exceed recommended levels. This advantageously allows action to be taken before damage to the system 20 occurs. It also can provide evidence to support or deny warranty claims, by providing evidence of contamination levels and service to the filtration system.

Figure 6:
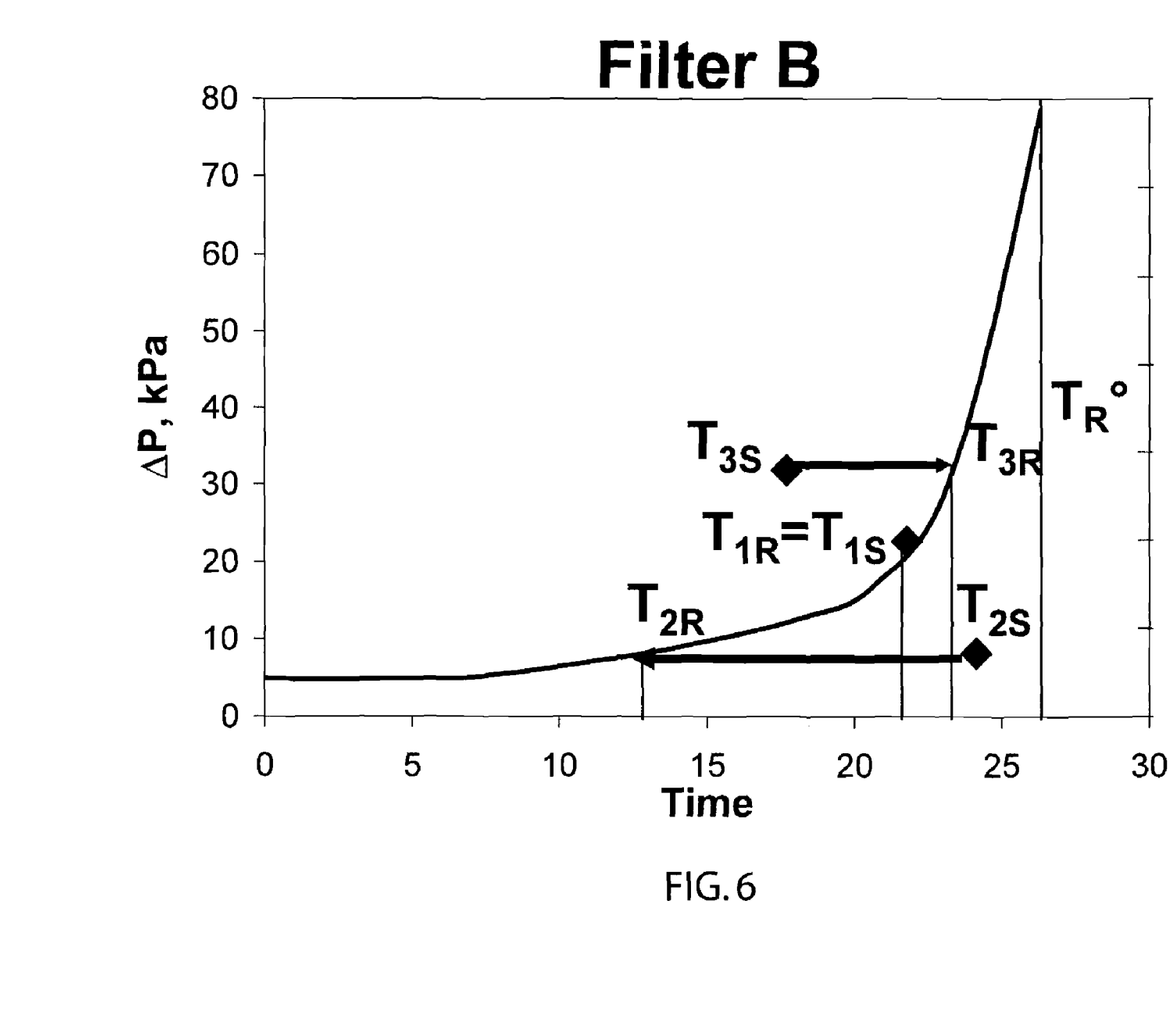
FIG. 6 is a graph illustrating normalized $\Delta P$ data for a reference filter as a function of time and three normalized $\Delta P$ values for the active filter shown in FIG. 1.

FIG. 6 illustrates a further extension of this approach. FIG. 6 is a graph illustrating ΔP behavior for a particular reference filter as a function of time. Note that in accordance with the discussion above, the graph of FIG. 6 can alternatively illustrate ΔP behavior for a particular reference filter as a function of the volume of fluid filtered. Using a similar process to that which was just described, the remaining useful life of the filter 26 can be estimated and displayed by measuring and normalizing ΔP data for the filter 26 and then comparing the normalized ΔP data and the known ΔP data for the reference filter. This is done by identifying the time (or volume of fluid) for the reference filter that yielded the same normalized ΔP as the system 20. The following equation 1 provides a first approximation of the remaining useful life of the filter 26:

$$T_M = (T_S/T_R° - T_R)$$

where $T_M$ is the estimated (modeled) remaining useful life or sample volume for the filter 26;

$T_S$ is the time or sample volume at which ΔP was measured;

$T_R$ is the time or sample volume required for the reference filter to obtain the same ΔP as the normalized ΔP; and $T_R°$ is the useful life or sample volume of the reference filter.

As an example, FIG. 6 charts three cases for which equation 1 can be used, in which $T_S$ is $T_{1S}$, $T_{2S}$, and $T_{3S}$; $T_R$ is $T_{1R}$, $T_{2R}$, and $T_{3R}$, for cases 1, 2 and 3, respectively; and $T_R°$ is shown. As is apparent from FIG. 6, the resultant $T_M$ values are only estimates, however the values are more accurate at intermediate normalized ΔP and provide operators with the benefit of being able to plan and schedule preventive maintenance at a convenient times, thus increasing uptime and equipment reliability.

Another extension of the approach just presented allows for estimation of the remaining useful life of critical system components e.g. fuel injectors, fuel filters, etc. supplied with fluid from the system 20. In general, the life of a component depends on the amount of contaminant to which it has been exposed. Whether it is injectors worn by hard abrasive contaminants or filters plugging, component life is a function of exposure to contamination. The relationship between component life and contaminant exposure can be determined under controlled conditions, such as in a lab test. According to some exemplary embodiments in the present application, contamination levels and remaining filter life are estimated based on the known relationship between contamination exposure (volume of fluid filtered at a known contaminant concentration) and pressure drop. This idea is extended further by using a previously known relationship between contamination exposure and component life to estimate remaining component life. The estimation can be completed based on knowledge of how long a working component will last upon exposure to a known contaminant concentration with the reference filter. This knowledge can be based on actual test data or by knowledge of the contaminant sensitivity of the component and the removal characteristics of the reference filter. Mathematically, the estimation of component life is similar to the above-described estimate of remaining filter life, and is given as:

$$T_{MC} = \frac{T_S}{T_R}\left(T_{RC} - \sum T_{RS,i} - T_R\right)$$

wherein $T_{MC}$ is the estimated (modeled) remaining useful life or sample volume of the working component being supplied with fluid having the reference contaminant concentration;

$T_S$ is the time or sample volume at which the normalized ΔP was measured for the current filter 26;

$T_R$ is the time or sample volume required for the reference filter to obtain the same ΔP as the normalized ΔP of the current filter 26;

$T_{RC}$ is the useful life or sample volume of the working component at the reference contaminant concentration; and $T_{RS,i}$ is the time or sample volume required for the reference filter to obtain the same ΔP as the normalized ΔP at changeout for each filter, i, that was used and replaced during the life of the working component.

For example, if a component lasts 1000 hrs at a certain contaminant concentration using a certain reference filter that lasts 250 hrs under these conditions, then $T_{RC}$=1000 hrs. Further, if there have been three (3) filter changes, made at the equivalent of 200 reference filter hrs, then $\Sigma T_{Rs,i}$=200+200+200=600 hrs. Finally, if the current (fourth) filter used with the component has been used for 100 actual hours or 200 reference filter hours, then $T_R$=200 hrs and $T_S$=100 hrs. The estimated remaining useful life of the component is:

$$T_{MC}=100(1000-600-200)/200=100$$

at current contamination levels. This information could be utilized to estimate the remaining useful life of a component and schedule its replacement.

It is important to note that the preceding equation for estimating the remaining useful life of a component reduces to the same equation used to calculate the remaining useful life of the filter. For another example, if the component is the fuel filter 26 and it lasts 200 hours under reference conditions at a certain contaminant concentration and flow rate, then $T_{RC}$=200 hours. Further, since it is used only once and then disposed of, then $\Sigma T_{RS,i}$=0 hours. Finally, if the current filter has been used for 200 actual hours or 100 reference hours, then $T_R$=100 hours and $T_S$=200 hours. The estimated remaining useful life of the component is:

$$T_{MC}=200(200-100)/100=200$$

at current contamination levels. This information can be utilized to estimate the remaining useful life of a filter component and schedule its replacement.

In the foregoing description, certain terms have been used for brevity, clearness, and understanding. No unnecessary limitations are to be implied therefrom because such terms are used for descriptive purposes and are intended to be broadly construed. The different configurations, systems and method steps described herein may be used alone or in combination with other configurations, systems and method steps. It is to be expected that various equivalents, alternatives and modifications are possible within the scope of the appended claims.

Advantageously, the methods and systems described and claimed herein are also useful in any one of a wide variety of applications having a fluid flow path for fuel, oil, lubrication, hydraulics, air, water and/or other fluids including gases and/or liquids.

Also, although graphs are used to illustrate the invention, it is anticipated that this would actually be done via software and algorithms in actual use, and it should also be noted that the interpretations made by the methods and systems described herein tend to be based on relatively long time scales, typically hours to days, rather than transient fluctuations occurring over a time scale of seconds to minutes, hence the use of data from a reference state is feasible and may be desirable in some applications.

What is claimed is:

1. A method of monitoring characteristics in a fluid flow path having a filter that is actively filtering fluid in the path, the method comprising the steps of:
   measuring $\Delta P$ (pressure drop) in the fluid as it flows through the active filter;
   normalizing the measured $\Delta P$ to a state having predetermined reference conditions;
   comparing the measured $\Delta P$ at the normalized state to a $\Delta P$ of a hypothetical reference filter for which there exists a known correlation between $\Delta P$ and contaminant removal from fluid under the predetermined reference conditions as a function of at least one of time, contaminant load and volume of fluid filtered;
   wherein the contaminant removal from fluid is defined by the time-weighted ratio of the number concentration of particles larger than a certain size upstream of the hypothetical reference filter to the number concentration of particles larger than the same size downstream of the hypothetical reference filter under a standardized laboratory filter test; and
   estimating contaminant removal from fluid filtered by the active filter as a function of at least one of time and contaminant load and volume of fluid filtered for the active filter wherein contaminant removal from fluid filtered by the active filter is estimated based on the known correlation between $\Delta P$ and contaminant removal from fluid under the predetermined reference conditions for the hypothetical reference filter.

2. The method of claim 1, wherein the reference conditions comprise fluid viscosity and fluid flow rate.

3. The method of claim 1, comprising the step of displaying the estimated contaminant removal.

4. The method of claim 1, comprising the step of providing an indication when the estimated contaminant removal is less than a predetermined value.

5. The method of claim 1, wherein the fluid comprises at least one of a fuel, a lubricant, a hydraulic fluid, water, and air.

6. A method of monitoring characteristics in a fluid flow path having a filter that is actively filtering fluid in the path, the method comprising the steps of:
   measuring $\Delta P$ (pressure drop) in the fluid as it flows through the active filter;
   normalizing the measured $\Delta P$ to a state having predetermined reference conditions;
   comparing the measured $\Delta P$ at the normalized state to a $\Delta P$ of a hypothetical reference filter for which there exists a known correlation between $\Delta P$ and contaminant removal from fluid under the predetermined reference conditions as a function of at least one of time, contaminant load and volume of fluid filtered;
   wherein the contaminant removal from fluid is defined by the time-weighted ratio of the number concentration of particles larger than a certain size upstream of the hypothetical reference filter to the number concentration of particles larger than the same size downstream of the hypothetical reference filter under a standardized laboratory filter test; and
   determining an operational condition of the active filter wherein the operational condition is determined based on the known correlation between $\Delta P$ and contaminant removal from fluid under the predetermined reference conditions for the hypothetical reference filter.

7. The method of claim 6, wherein the operational condition comprises compromised filter integrity when the measured $\Delta P$ at the normalized state is less than a predetermined level compared to the known correlation between $\Delta P$ and contaminant removal.

8. The method of claim 6, wherein the operational condition comprises proper filter operation when the measured $\Delta P$ at the normalized state is within a predetermined range compared to the known correlation between $\Delta P$ and contaminant removal.

9. The method of claim 6, wherein the operational condition comprises degraded filter performance when the measured $\Delta P$ at the normalized state is within a predetermined range compared to the known correlation between $\Delta P$ and contaminant removal.

10. The method of claim 6, wherein the operational condition comprises plugged filter operation when the measured ΔP at the normalized state is greater than a predetermined level compared to the known correlation between ΔP and contaminant removal.

11. The method of claim 6, wherein the reference conditions comprise fluid viscosity and fluid flow rate.

12. The method of claim 6, wherein the fluid comprises at least one of a fuel, a lubricant, a hydraulic fluid, water, and air.

13. A fluid filtration system comprising:
a fluid flow path having at least one filter actively filtering fluid that flows along the flow path;
a sensor measuring ΔP (pressure drop) in the fluid as it flows through the active filter; and
a controller programmed to (1) normalize the measured ΔP to a state having predetermined reference conditions, (2) compare the measured ΔP at the normalized state to a ΔP of a hypothetical reference filter for which there exists a known correlation between ΔP and contaminant removal from fluid under the predetermined reference conditions as a function of at least one of time, contaminant load and volume of fluid filtered, (3) analyze the contaminant removal from the fluid, and (4) define contaminant removal from fluid by the time-weighted ratio of the number concentration of particles larger than a certain size upstream of the hypothetical reference filter to the number concentration of particles larger than the same size downstream of the hypothetical reference filter under a standardized laboratory filter test; and
wherein the controller is programmed to estimate contaminant removal from fluid filtered by the active filter as a function of at least one of time, contaminant load and volume of fluid filtered for the active filter, and the controller estimates contaminant removal from fluid filtered by the active filter based on the known correlation between ΔP and contaminant removal from fluid under the predetermined reference conditions for the hypothetical reference filter.

14. The system of claim 13, comprising a display for displaying the estimated contaminant removal.

15. The system of claim 13, comprising means for providing an indication to a user when the estimated contaminant removal is less than a predetermined value.

16. The system of claim 13, wherein the fluid comprises at least one of a fuel, a lubricant, a hydraulic fluid, water, and air.

17. A fluid filtration system comprising:
a fluid flow path having at least one filter actively filtering fluid that flows along the flow path;
a sensor measuring ΔP (pressure drop) in the fluid as it flows through the active filter; and
a controller programmed to (1) normalize the measured ΔP to a state having predetermined reference conditions, (2) compare the measured ΔP at the normalized state to a ΔP of a hypothetical reference filter for which there exists a known correlation between ΔP and contaminant removal from fluid under the predetermined reference conditions as a function of at least one of time, contaminant load and volume of fluid filtered, (3) analyze the contaminant removal from the fluid, and (4) define contaminant removal from fluid by the time-weighted ratio of the number concentration of particles larger than a certain size upstream of the hypothetical reference filter to the number concentration of particles larger than the same size downstream of the hypothetical reference filter under a standardized laboratory filter test; and
wherein the controller is programmed to determine an operational condition of the active filter, and the programmed controller determines the operational condition based on the known correlation between ΔP and contaminant removal from fluid under the predetermined reference conditions for the hypothetical reference filter.

18. The system of claim 17, wherein the operational condition comprises compromised filter integrity when the measured ΔP at the normalized state is less than a predetermined level compared to the known correlation between ΔP and contaminant removal.

19. The system of claim 17, wherein the operational condition comprises proper operation when the measured ΔP at the normalized state is within a predetermined range compared to the known correlation between ΔP and contaminant removal.

20. The system of claim 17, wherein the operational condition comprises degraded filter performance when the measured ΔP at the normalized state is within a predetermined range compared to the known correlation between ΔP and contaminant removal.

21. The system of claim 17, wherein the operational condition comprises plugged filter operation when the measured ΔP at the normalized state is greater than a predetermined level compared to the known correlation between ΔP and contaminant removal.

22. The system of claim 17, wherein the fluid comprises at least one of a fuel, a lubricant, a hydraulic fluid, water, and air.

* * * * *